United States Patent
Cho et al.

(10) Patent No.: US 7,978,856 B2
(45) Date of Patent: Jul. 12, 2011

(54) METHODS OF MANAGING A KEY CACHE (75) Inventors: Kyung-min Cho, Incheon (KR); Jong-il Park, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1051 days.

(21) Appl. No.: 11/802,893

(22) Filed: May 25, 2007

(65) Prior Publication Data
US 2008/0069361 A1    Mar. 20, 2008

(30) Foreign Application Priority Data
May 26, 2006    (KR) .................. 10-2006-0047526

(51) Int. Cl.
H04L 9/00 (2006.01)
H04L 9/32 (2006.01)
G06F 7/04 (2006.01)

(52) U.S. Cl. ........ 380/277; 380/278; 380/279; 380/280; 380/281; 380/282; 713/169; 713/170; 713/171; 713/172; 713/173; 726/27; 726/28; 726/29; 726/30

(58) Field of Classification Search .................... 380/277
See application file for complete search history.

(56) References Cited

U.S. PATENT DOCUMENTS

| 2002/0059286 A1 | 5/2002 | Challener |
| 2005/0235141 A1 | 10/2005 | Ibrahim et al. |
| 2007/0168048 A1* | 7/2007 | Allen et al. ...................... 700/2 |
| 2007/0192592 A1* | 8/2007 | Goettfert et al. .............. 713/162 |

FOREIGN PATENT DOCUMENTS
KR    1020050063669 A    6/2005

* cited by examiner

Primary Examiner — Longbit Chai
(74) Attorney, Agent, or Firm — Harness, Dickey & Pierce

(57) ABSTRACT

Methods of managing a key cache are provided. One method may include determining whether a given key has previously been loaded to a trusted platform module (TPM), loading the given key to the TPM and generating a key cache object corresponding to the given key if the determining step determines the given key has not previously been loaded to the TPM and restoring the given key to the TPM based on the key cache object corresponding to the given key if the given key has previously been loaded. Another method may include extracting a key from a TPM if the TPM does not have sufficient memory to load a new key, the extracted key corresponding to a least frequently used key cache object within the TPM. Another method may include restoring a key to a TPM, the restored key having been previously loaded to and extracted from the TPM.

45 Claims, 9 Drawing Sheets

METHODS OF MANAGING A KEY CACHE

PRIORITY STATEMENT

This application claims the benefit of Korean Patent Application No. 10-2006-0047526, filed on May 26, 2006, in the Korean Intellectual Property Office, the disclosure of which is incorporated herein in its entirety by reference.

BACKGROUND OF THE INVENTION

1. Field of the Invention

Example embodiments of the present invention relate generally to methods of managing a key cache, and more particularly to methods of managing a key cache for a trusted platform module (TPM).

2. Description of the Related Art

A system-on-chip (SoC) (e.g., standardized by Trust computing group (TCG)) may be configured in order to provide secure key management and platform integrity. The standardized SoC may be referred to as a trusted platform module (TPM). Applications may use a TPM software stack (TSS) to load keys to the TPM. The TSS may be a standard application programming interface (API) by which applications use the TPM.

The TSS may be divided into a TSS service provider (TSP) and a TSS core service (TCS). The TSP may be provided as a dynamic library to applications and the TCS may be provided as a system service or "daemon" to the TSP. Accordingly, applications may call the API of the TSP and/or the TSP may call the API of the TCS in order to use the TPM.

Figure 1:
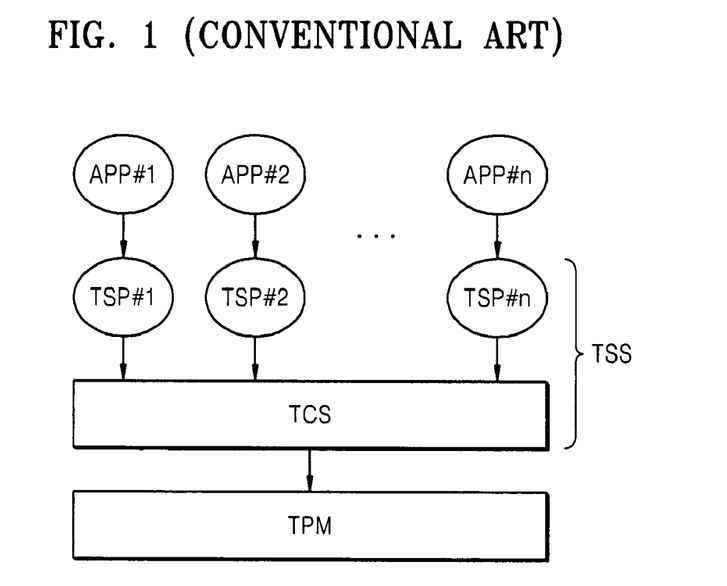
FIG. 1 illustrates a relationship between a trusted platform module (TPM) and a TPM software stack (TSS) according to conventional Trust computing group (TCG) specifications.

FIG. 1 illustrates a relationship between the TPM and the TSS according to conventional TCG specifications. Referring to FIG. 1, applications APP#1 through APP#n may request the TPM to load keys. Key slots corresponding to the keys may be allocated to the TPM for the requests of the applications APP#1 through APP#n.

Referring to FIG. 1, the TPM may correspond to hardware that is an SoC having relatively limited memory resources. Furthermore, increasing the capacity of the TPM may be relatively expensive. Limitations on TPM memory resources may restrict key loading functionality.

Further, different versions of the TPM and TSS may be executed at the same time because developments of the TPM and TSS, respectively, may be based upon both hardware engineering and software engineering, which may not necessarily progress at the same rate. However, it may be difficult to implement different versions of the TPM and TSS due to compatibility issues.

SUMMARY OF THE INVENTION

An example embodiment of the present invention is directed to a method of managing a key cache, including determining whether a given key has previously been loaded to a trusted platform module (TPM), loading the given key to the TPM and generating a key cache object corresponding to the given key if the determining step determines the given key has not previously been loaded to the TPM and restoring the given key to the TPM based on the key cache object corresponding to the given key if the determining step determines the given key has previously been loaded to the TPM.

Another example embodiment of the present invention is directed to a method of managing a key cache, including extracting a key from a TPM if the TPM is determined not to have sufficient memory to load a new key, the extracted key corresponding to a least frequently used key cache object within the TPM if the TPM is operating in accordance with a first TPM protocol, the extracted key not requiring authentication for loading to or extracting from the TPM and corresponding to a least frequently used key cache object within the TPM if the TPM is operating in accordance with a second TPM protocol.

Another example embodiment of the present invention is directed to a method of managing a key cache, including restoring a key to a trusted platform module (TPM), in response to a request to load the restored key, the restored key having been previously loaded to and extracted from the TPM, the restored key being restored to a key slot unit if the TPM is operating in accordance with a first TPM protocol, and the restored key being restored in a data structure of the restored key if the TPM is operating in accordance with a second TPM protocol.

Another example embodiment of the present invention is directed to a method of managing a key cache, including storing information corresponding to a key requested to be loaded into a TPM within a key cache object, the information stored within the key cache object including a position of the key, an indication as to whether the key is stored in memory, an indicator indicating a frequency of use of the key, a point value associated with data of the key, the point value affected by which of a plurality of TPM protocols is active, information associated with a parent key of the key and information extracted related to data extracted from the TPM.

Another example embodiment of the present invention is directed to a key cache management process in a TPM software stack core service (TCS), which is performed in compatibility with the version of a trusted platform module (TPM) while efficiently managing a limited TPM memory resource.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

DETAILED DESCRIPTION OF EXAMPLE EMBODIMENTS

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention are susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
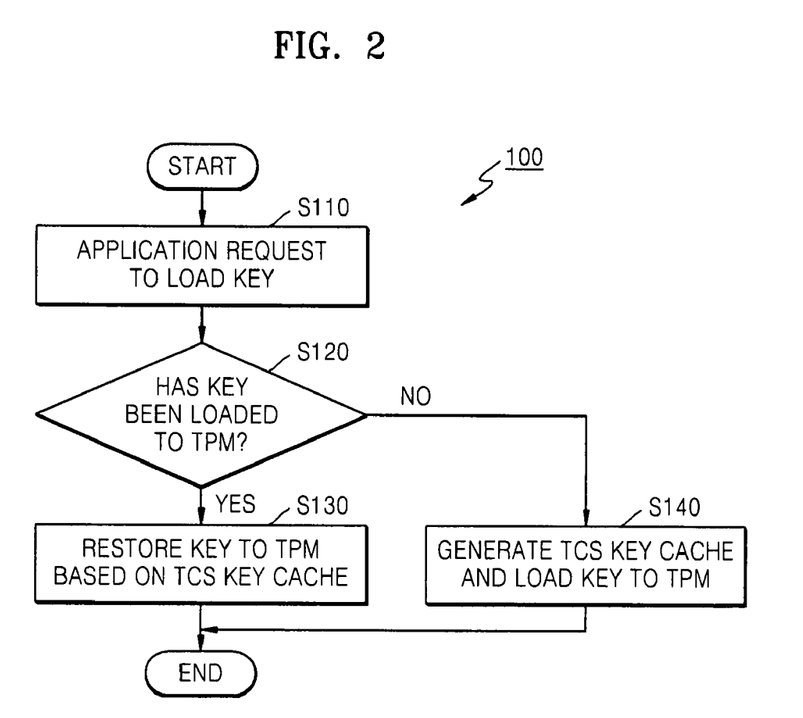
FIG. 2 is a flow chart of a key cache management process on a TSS for loading a key to a TPM according to an example embodiment of the present invention.

FIG. 2 is a flow chart of a key cache management process 100 on a trusted platform module (TPM) software stack (TSS) for loading a key to a TPM according to an example embodiment of the present invention.

In the example embodiment of FIG. 2, the key cache management process 100 may include receiving an application request to load a key to the TPM (at S110), determining whether the requested key has been loaded to the TPM (at S120), restoring the key to the TPM through a key cache object corresponding to the key if the key is determined to have been loaded to the TPM (at S130), and generating the key cache object corresponding to the key and loading the key to the TPM if the key has not been loaded to the TPM (at S140).

Figure 3:
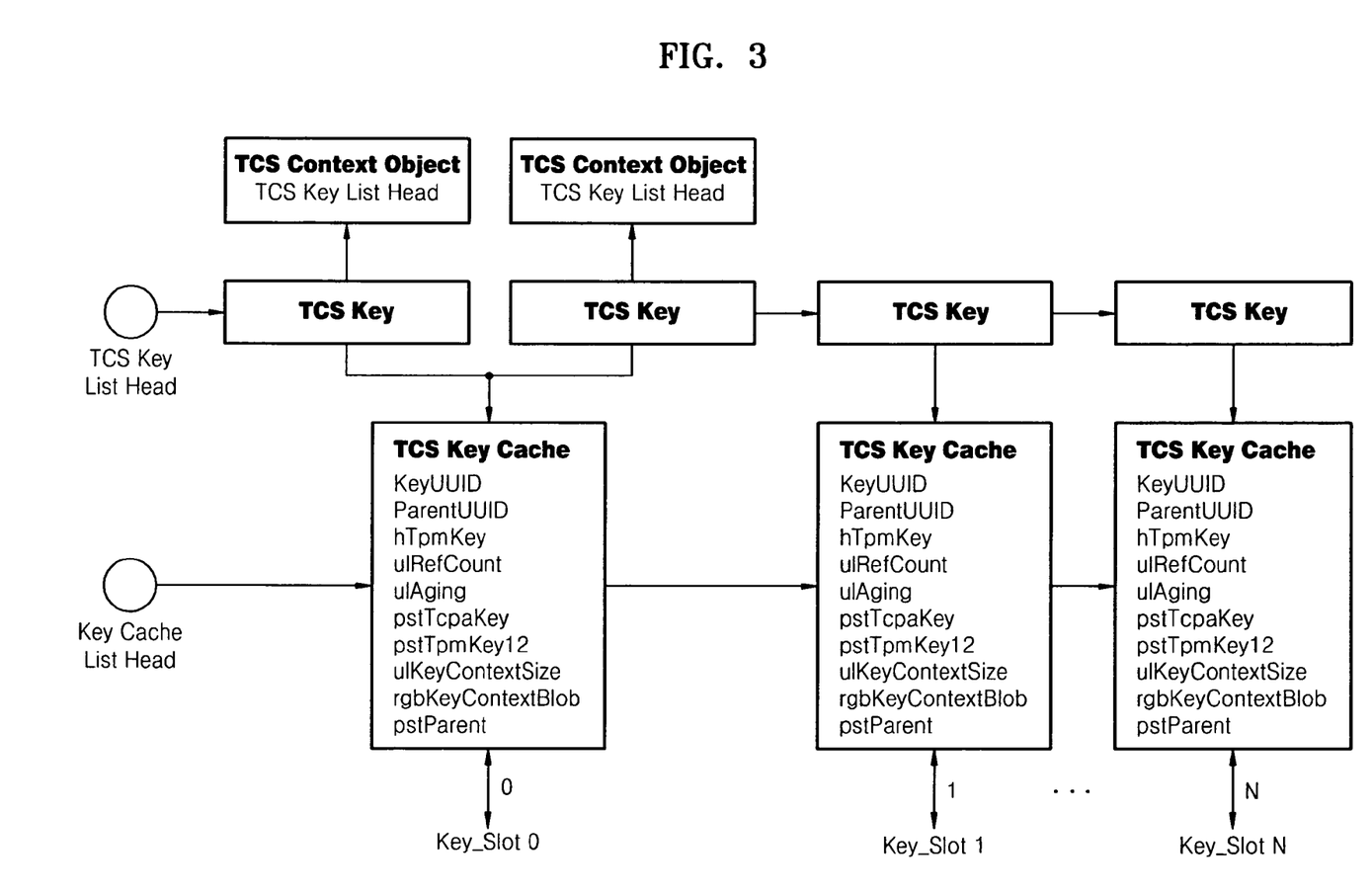
FIG. 3 is a block diagram illustrating a relationship between a context manager (CM) and a key cache manager (KCM) of a TSS core service (TCS) according to the key cache management process of FIG. 2.

FIG. 3 is a block diagram illustrating a relationship between a context manager (CM) and a key cache manager (KCM) of a TSS core service (TCS) according to the key cache management process 100 of FIG. 2.

In the example embodiments of FIGS. 2 and 3, the key cache management process 100 may generate a trusted platform module software stack core service (TCS) context object in response to an application request (e.g., S110 of FIG. 2) to load a key to the TPM. In an example, the TCS context object may be generated for each application.

In the example embodiments of FIGS. 2 and 3, the TCS context object may store information associated with a TCS key list head. A TCS key may include a point value associated with a TCS key cache. That is, the key cache management process 100 may generate the TCS key cache in response to the application request (at S110) to load a key in order to manage the requested key and may communicate with the application through the TCS key that points to the TCS key cache.

In the example embodiments of FIGS. 2 and 3, if the request to load the key is generated (at S110), the key cache management process 100 may determine whether the requested key has been loaded to the TPM (at S120). Thus, at S120, whether a TCS key cache corresponding to the requested key is present within the TCS may be determined.

In the example embodiments of FIGS. 2 and 3, the TCS may construct the TSS together with a TSS service provider TSP. In an example, the TCS may correspond to an interface through which the application request to load the key to the TPM (at S110) is received. The TCS may include a context manager (CM) that manages the TCS context object and a key cache manager (KCM) that manages the TCS key cache.

In the example embodiments of FIGS. 2 and 3, during the key cache management process 100 of FIG. 1, the TCS key cache may store information related to a key that is loaded or has previously been loaded to the TPM. The TCS key cache may be generated for each key. The key cache management process 100 may manage the request of an application to load a key to the TPM through the TCS key cache.

In the example embodiments of FIGS. 2 and 3, the TCS key cache may store information relating to the position of the corresponding key in the TPM and information about a relative point of time if the TCS key cache is used. The information stored in the TCS key cache will be explained in greater detail. In an example, the TCS key cache may be embodied as a linked list.

Figure 4:
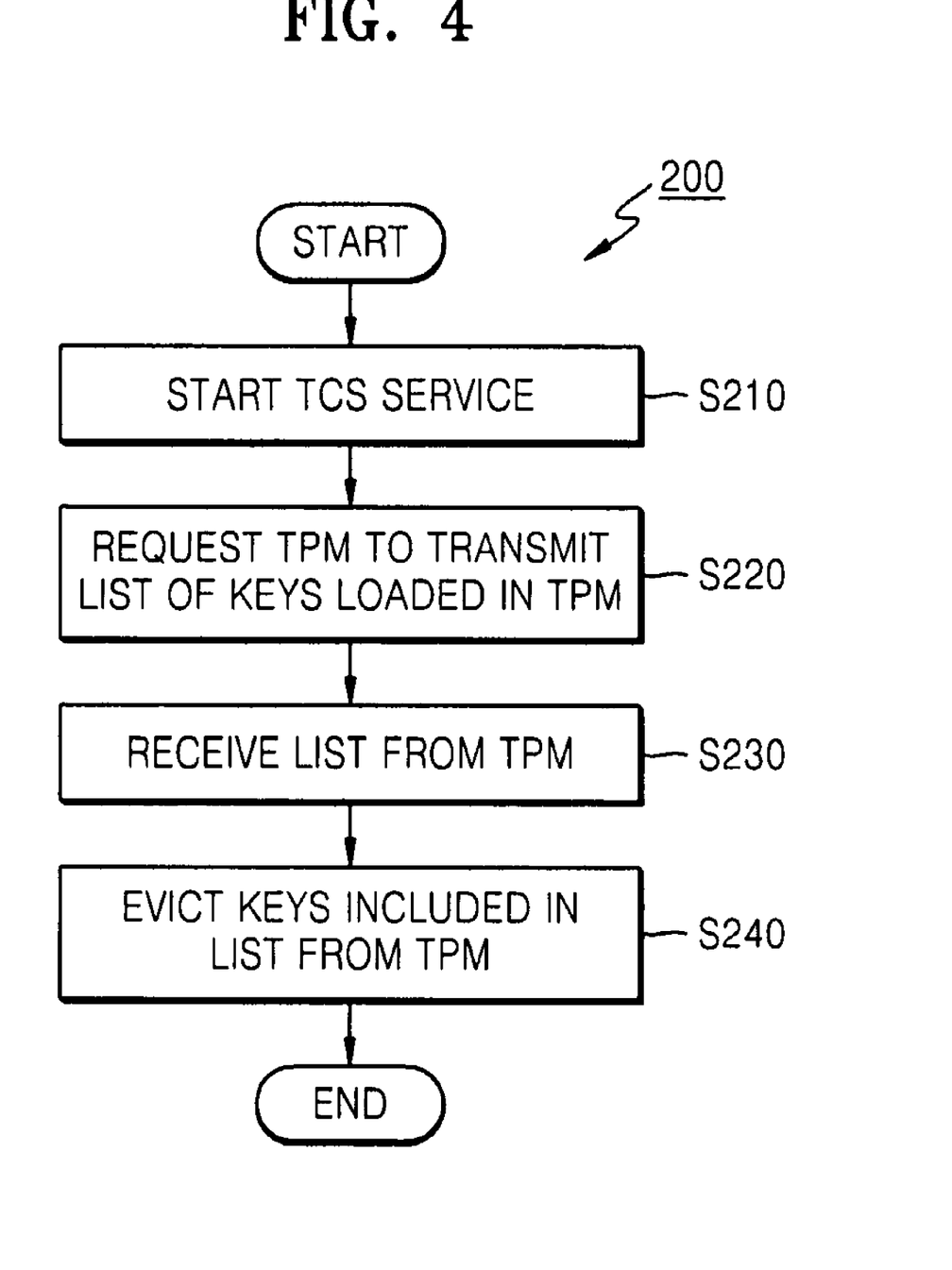
FIG. 4 is a flow chart illustrating a process of initializing a key cache list according to another example embodiment of the present invention.

FIG. 4 is a flow chart illustrating a process 200 of initializing a key cache list according to another example embodiment of the present invention.

In the example embodiment of FIG. 4, the TCS may initialize the key cache list (e.g., a linked list) (at S210). For example, the initialization of S210 may synchronize the KCM with the TPM.

In the example embodiment of FIG. 4, if the TCS is operated, the TCS may request the TPM to transmit a list of keys (e.g., all keys) loaded in the TPM (at S220). The requested list of keys loaded in the TPM may include information related to key handles, which may indicate the positions of the loaded keys. Once the requested list of keys is received from the TPM (at S230), the TCS may evict or flush the keys included in the list from the TPM in response to a command TPM_FlushSpecific or TPM_Evict (at S240).

Returning to the example embodiments of FIGS. 2 and 3, if the requested key(s) have not been loaded in the TPM, the TCS key cache corresponding to the key may not be present within the TPM. Accordingly, in this case, the key cache management process 100 may generate the TCS key cache corresponding to the requested key(s) (at S140) (e.g., to load the "missing" key into the TPM so the application may access a desired key).

Figure 5:
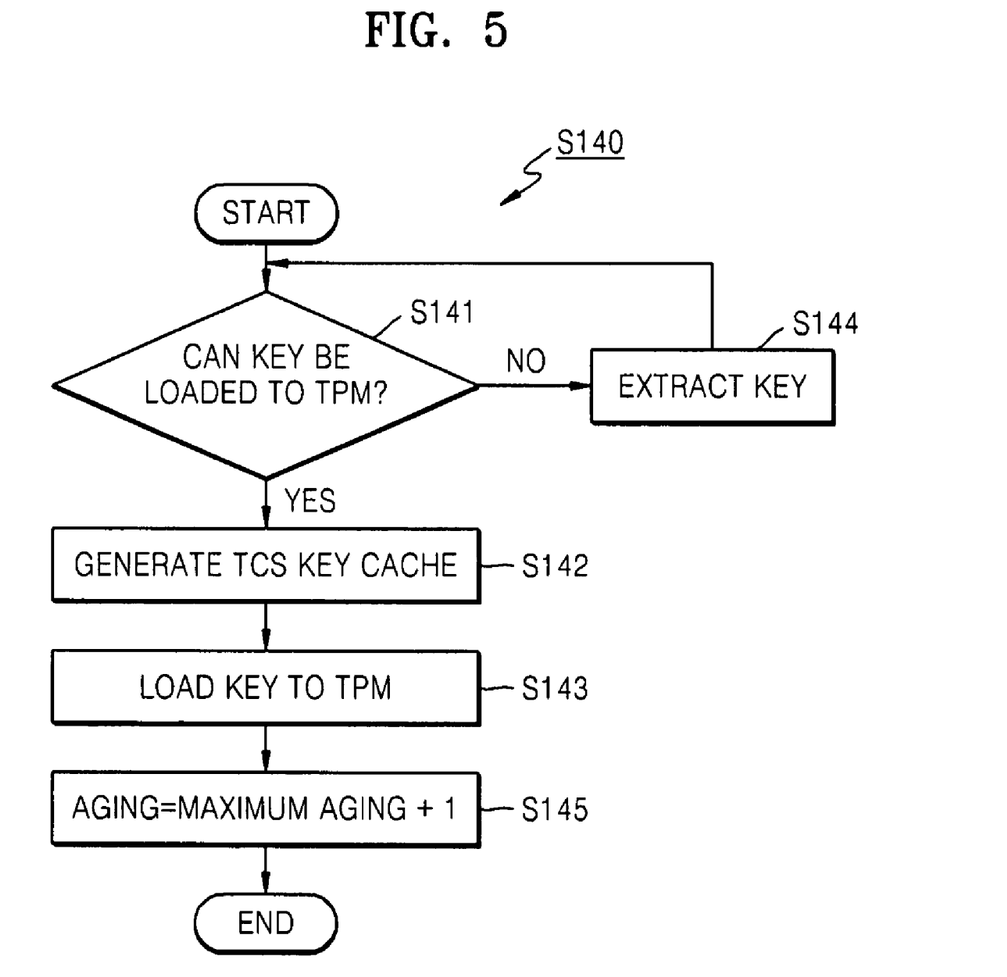
FIG. 5 is a flow chart illustrating a TCS key cache generation process according to another example embodiment of the present invention.

FIG. 5 is a flow chart illustrating a TCS key cache generation process S140 according to another example embodiment of the present invention. In an example, the TCS key cache generation process S140 of FIG. 5 may be an example implementation of block S140 of FIG. 2.

In the example embodiments of FIGS. 3 and 5, a determination may be made as to whether the TPM includes sufficient memory to load the requested key (at S141). If the TPM does not include sufficient memory to load an additional key, a key from the TPM may be extracted (at S144), which will be described in greater detail below.

In the example embodiment of FIG. 5, if the TPM includes sufficient memory or space for loading the requested key, the TCS key cache corresponding to the key may be generated (at S142). For example, if a request to load a key stored in a persistent storage (PS) is transmitted to the TCS, the TCS key cache may store a Key Universal Unique Identifier (KeyUUID) and/or a Parent key Universal Unique Identifier (ParentUUID) indicating whether the requested key is stored in memory. For example, if the requested key is stored in the PS, the requested key may include a KeyUUID. The TCS key cache may store the KeyUUID so as to maintain a record indicating that the requested key is stored in the PS.

Furthermore, the TCS key cache may store the ParentUUID of the requested key so as to maintain a record indicating that the ParentUUID is stored in the PS. The relationship between the key and the parent key is well-known in the art, and as such a further description thereof has been omitted for the sake of brevity.

Figure 6:
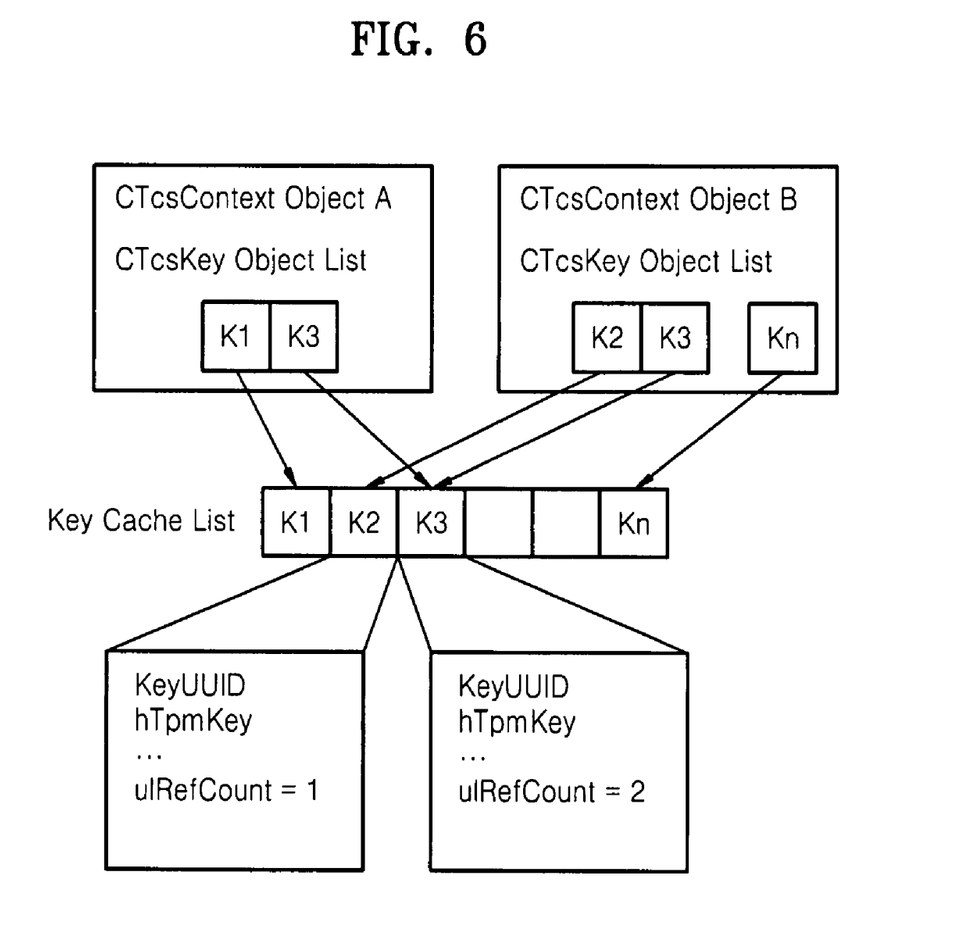
FIG. 6 illustrates a TCS key cache according to another example embodiment of the present invention.

FIG. 6 illustrates a TCS key cache according to another example embodiment of the present invention.

In the example embodiments of FIGS. 3 and 6, the TCS may generate a TCS context object corresponding to each application and the TCS key cache corresponding to the requested key, as described above. If a plurality of applications requests to load the same key, the TCS key cache may shared by the plurality of applications. That is, the TCS key cache may be shared by a plurality of TCS context objects.

In the example embodiment of FIG. 6, the TCS context objects A and B may share a TCS key cache K3. The TCS key cache may store information ulRefCount indicating a number of applications sharing the TCS key cache. That is, the TCS key cache may store information ulRefCount indicating the number of the TCS context objects.

In the example embodiment of FIG. 6, the TCS key cache K3 shared by the TCS context objects A and B may store "2" as ulRefCount (e.g., indicating that the TCS key cache K3 is shared) and a TCS key cache K2 store "1" as ulRefCount (e.g., indicating that the TCS key cache K2 is not shared).

Returning to the example embodiments of FIGS. 3 and 5, the TPM may load the requested key in response to a command TPM_LoadKey and may transmit a TPM key handle to the TCS. The TPM key handle may include information indicating the position of the key in the TPM. The TCS key cache may store a TPM key handle value hTpmKey.

In the example embodiments of FIGS. 3 and 5, the TCS key cache may store information pstTcpaKey and pstTpmKey12 indicating a key data structure (e.g., the key data structure may vary based on which version of the TPM is active). If a key is loaded to a TPM having limited resources (e.g., a lower available memory), the TCS may extract or remove keys that are not used frequently from the TPM (e.g., without notifying applications as to the key removal(s)) and may thereafter restore the extracted/removed key(s) if a request for the extracted/removed keys is received. Such an operation may be referred to as load key transparency. In an example, a difference between versions TSS 1.1 and TSS 1.2 of the TPM may be related to whether the load key transparency is limited or not.

For example, if the version TSS 1.2 of the TPM supports TPM_LoadKeyContext and TPM_EvictKeyContext according to the TCG specifications, the TCS may load or extract the key to/from the TPM in a key slot unit storing data corresponding to the key. Accordingly, the version TSS 1.2 of the TPM may reduce a restriction of the load key transparency present within the version TSS 1.1 of the TPM. In another example, in the case of the version TSS 1.1 of the TPM, a load key transparency restriction may occur because authentication for loading/extracting a corresponding key to/from the TPM may be required. However, the authentication for loading/extracting a key to/from the TPM need not be received in version TSS 1.2 of the TPM.

In another example, a TPM may use different data structures for a key according to its respective version (e.g., TSS 1.1 or 1.2). For example, the version TSS 1.1 of the TPM may represent the key using a structure TCPA_KEY, whereas the version TSS 1.2 of the TPM may represent the key using a structure TPM_KEY12.

In the example embodiment of FIG. 6, the TCS key cache may store a point value pstTcpaKey or pstTpmKey12 indicating the structure TCPA_KEY or TMP_KEY12 according to the version of the TPM in order to indicate key data loaded in the TPM. The generating of the TCS key cache (at S140) and loading the generated TCS cache to the TPM (at S143) may further include confirming the version of the TPM in order to store the information pstTcpaKey and pstTpmKey12 indicating a key data structure based on the version of the TPM in the TCS key cache.

In the example embodiment of FIG. 2, the key cache management process 100 may store the information pstTcpaKey and pstTpmKey12 indicating the key data structure based on the version of the TPM in the TCS key cache so that the TCS or TSS may be operated irrespective of the version of the TPM.

Returning to the example embodiments of FIGS. 3 and 5, the TCS may extract a given key from among the keys loaded in the TPM (at S144) if the space or memory for loading the key is not sufficient in the TPM. The key extraction process will be described in greater detail later.

In the example embodiments of FIGS. 3 and 5, the TCS key cache may be generated and the key may be loaded to the TPM so that the key handle value hTpmKey may be stored in the TCS key cache, an aging value of the TCS key cache may be updated to a value larger than a maximum aging value (at S145). In an example, the aging value may represent a relative point of time indicating when the TCS key cache is used. A previously used TCS key cache may have a smaller aging value. For example, a TCS key cache having an aging value of "1" may be dormant (e.g., not used) for a longer period of time than a TCS key cache having an aging value of "4". The maximum aging value may correspond to the aging value of the most recently used TCS key cache among the TCS key caches.

Returning to the example embodiment of FIG. 2, the key cache management process 100 may restore the key to the TPM through the TCS key cache corresponding to the key (at S130) if the key has been loaded to the TPM. Thus, a new TCS key cache need not be generated because the TCS key cache corresponding to the key may be present. Thus, the key may be restored to the TPM using information associated with the key stored in the TCS key cache that has been already or previously generated. For example, the key may be restored to the TPM using an example process based on the version of the TPM (at S130).

Figure 7:
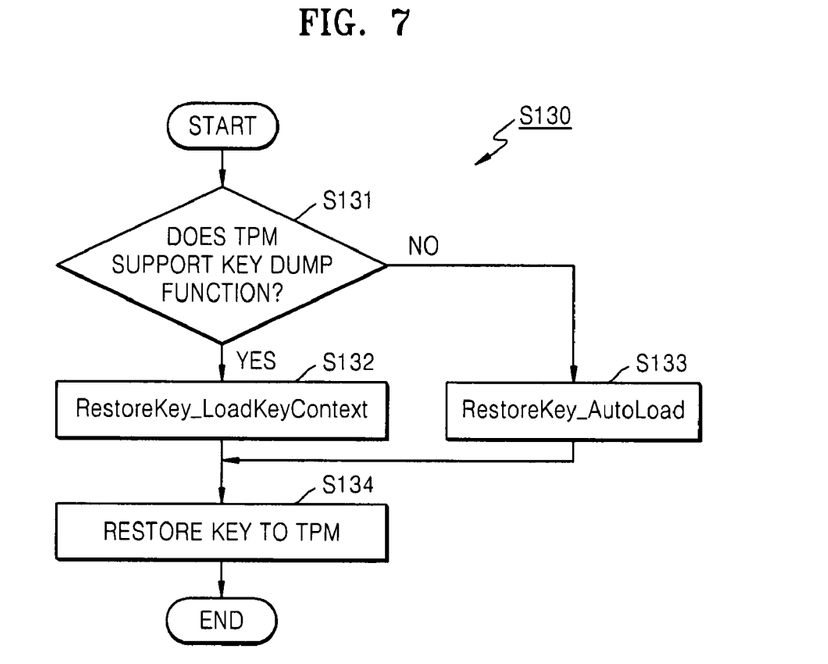
FIG. 7 is a flow chart illustrating a key restoration process according to another example embodiment of the present invention.

FIG. 7 is a flow chart illustrating a key restoration process S130 according to another example embodiment of the present invention. In an example, the key restoration process S130 may correspond to S130 of the example embodiment of FIG. 2.

In the example embodiment of FIG. 7, the version of the TPM may be confirmed to determine whether a key dump function may be used (at S131). As described above, in the case of the version TSS 1.2 of the TPM, the key may be loaded or extracted in a key slot unit, which may be referred to as a key dump function.

In the example embodiment of FIG. 7, if the TPM supports the key dump function, the TCS may restore the key to the TPM in a key slot unit (at S132 and S134), which may be referred to as a function RestoreKey_AutoLoad. Alternatively, if the TPM does not support the key dump function, the TCS may restore the key to the TPM in the unit of a data structure of the key (at S133 and S134), which may be referred to as a function RestoreKey_AutoLoad.

Figure 8:
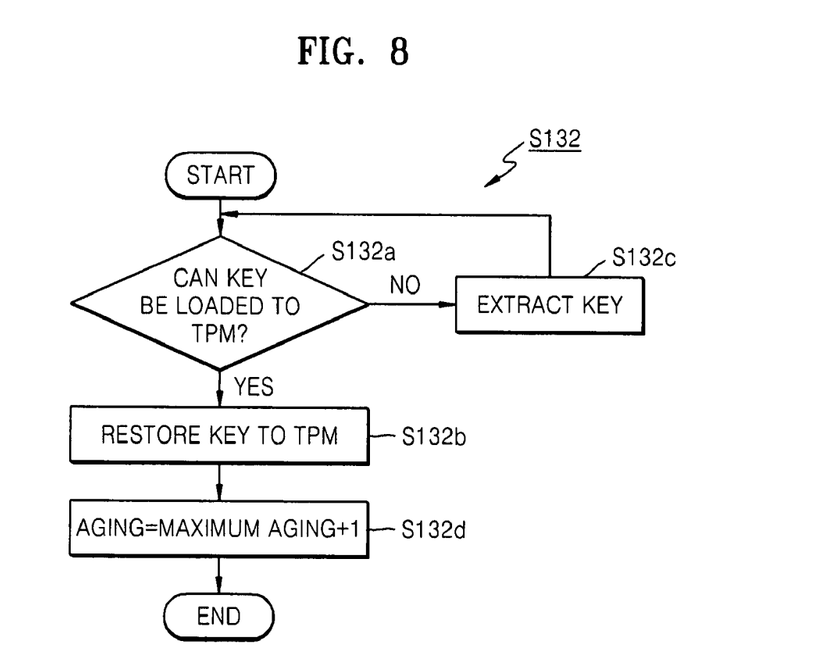
FIG. 8 is a flow chart illustrating the RestoreKey_LoadContext function of FIG. 7 according to another example embodiment of the present invention.

FIG. 8 is a flow chart illustrating the RestoreKey_LoadContext function S132 of FIG. 7 according to another example embodiment of the present invention.

In the example embodiment of FIGS. 3 and 8, a determination may be made as to whether the TPM includes sufficient space or memory for loading the requested key (at S132a). If the TPM includes sufficient memory, the TCS may restore the key to the TPM (at S132b). For example, the key restoration may be carried out based on the TCS key cache. Otherwise, if the TPM does not include sufficient memory, one or more keys may be extracted from the TPM (e.g., a less frequently used key may be removed from the TPM) (at S132c), which will be described in greater detail later.

In the example embodiments of FIGS. 3 and 8, the TCS may extract a key satisfying a given condition from keys loaded in the TPM if the TPM does not include sufficient space or memory for loading the requested key because the TCS key cache may store information rgbKeyContestBlob and ulKeyContextSize related to the extracted key. In this case, rgbKeyContestBlob may represent data of the dumped key and ulKeyContextSize may represent the byte size of rgbKeyContestBlob. A further description of the extraction process of a key (at S132c) in the TPM will be explained in greater detail later.

In the example embodiment of FIGS. 3 and 8, the aging value of the TCS key cache may be updated to a value larger than the maximum aging value because the TCS key cache has been used to restore the key (at S132d).

Figure 9:
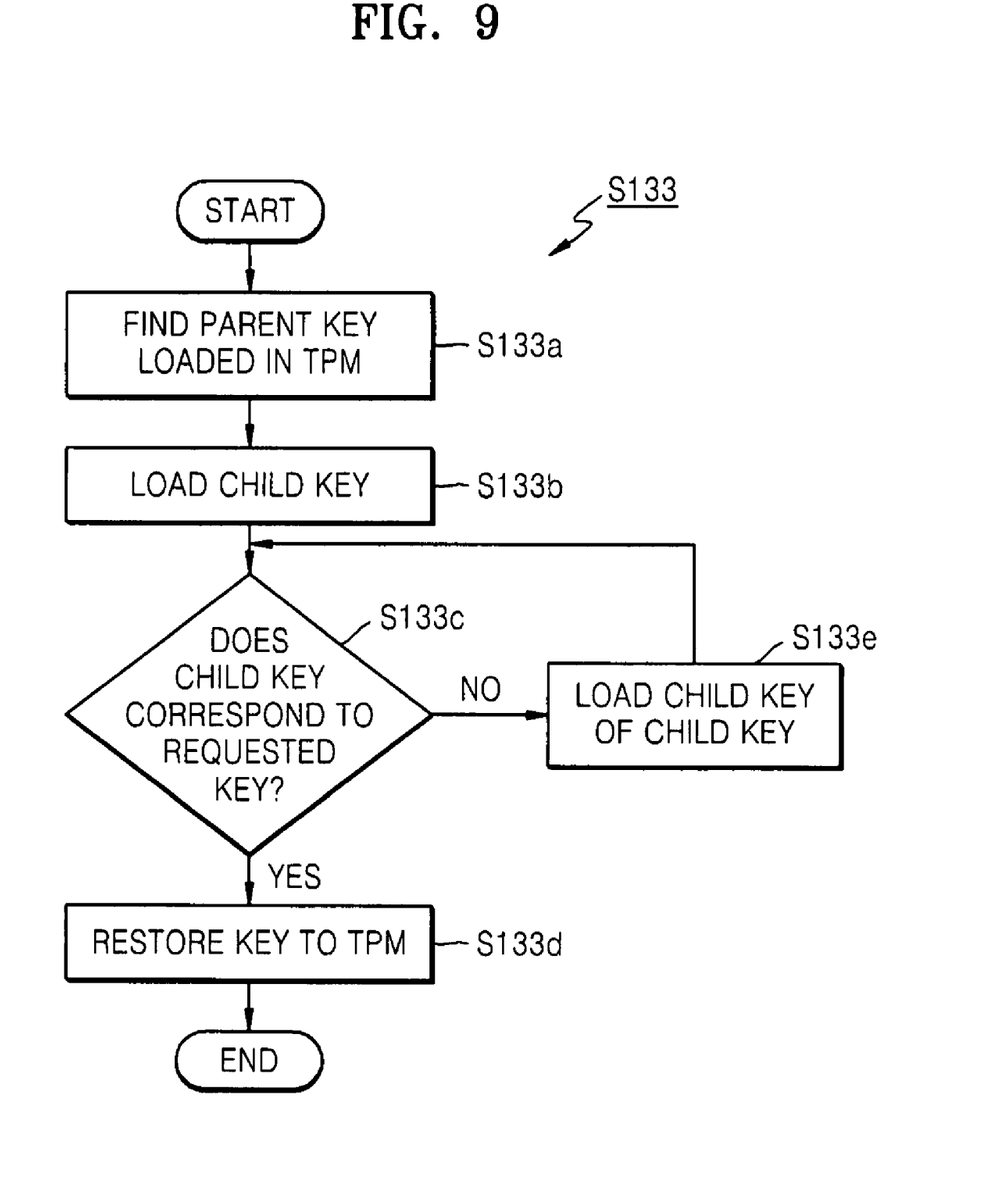
FIG. 9 is a flow chart illustrating the RestoreKey_AutoLoad function of FIG. 7 according to another example embodiment of the present invention.

FIG. 9 is a flow chart illustrating the RestoreKey_AutoLoad function S133 of FIG. 7 according to another example embodiment of the present invention.

In the example embodiments of FIGS. 3 and 9, the RestoreKey_AutoLoad method S133 may locate the parent key of the requested key, which may be loaded into the TPM (at S133a). As described above, the RestoreKey_AutoLoad function S133 may be applied to the TPM that need not support the key dump function because the parent key of the key may be required to be loaded into the TPM in order to load/extract the key to/from the TPM.

In the example embodiment of FIGS. 3 and 9, the parent key and the child key may be judged through the KeyUUID and ParentUUID stored in the TCS key cache. The TCS may store pointer information pstParent of a parent key cache object in the TCS key cache so that the relationship of the parent key and the child key may be determined.

In the example embodiment of FIGS. 3 and 9, if the parent key loaded into the TPM is determined, the child key of the parent key may be loaded into the TPM (at S133b). If the child key is determined to correspond to the key requested to be loaded (at S133c), the child key may be restored to the TPM (at S133d). Otherwise, if the child key is determined not to correspond to the key requested to be loaded, the TCS may load the child key of the child key (at S133e) and may then return to S133c where the child key of the child key may be compared with the requested key, and so on.

In the example embodiments of FIGS. 7 though 9, the RestoreKey_AutoLoad function S133 of FIG. 8 may be similar to the RestoreKey_LoadContext function S132 of FIG. 7, in that a key satisfying a given condition (e.g., less frequent use) may be extracted or removed from keys loaded in the TPM if the TPM has no space for loading the additional or restored key.

In another example embodiment of the present invention, referring to FIGS. 7 through 9, key cache management may be performed irrespective of a TPM version employed by an application.

Figure 10:
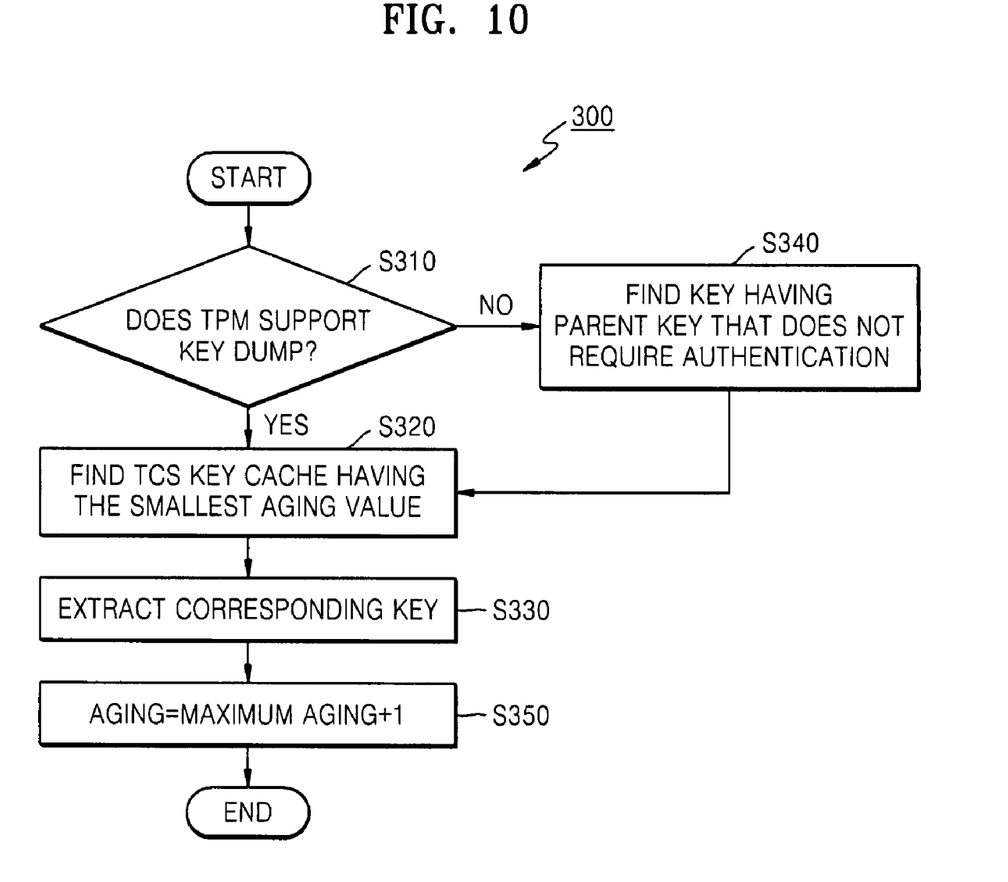
FIG. 10 is a flow chart of a process of extracting a key in the TPM according to another example embodiment of the present invention.

FIG. 10 is a flow chart of a process 300 of extracting a key in the TPM according to another example embodiment of the present invention. In an example, the key extraction process 300 may correspond to S144 of FIG. 5 and/or S132c of FIG. 8.

In the example embodiment of FIG. 10, the TCS may extract a key satisfying a given condition from keys loaded in the TPM if the TPM does not have sufficient space or memory for loading the key. In an example, the key extracting process 300, as will now be described, may be based on the version of the TPM (e.g., 1.1, 1.2, etc.).

In the example embodiment of FIG. 10, if the TPM is determined to support the key dump function (at S310), the TCS may extract a key corresponding to the TCS key cache having the smallest aging value from the keys loaded in the TPM (at S320). Accordingly, the key that has not been used for the longest period of time (e.g., the least frequently used key) may be extracted (e.g., removed from the TPM), which may be referred to as a function ExtractKey_SaveKeyContext (at S330).

In the example embodiment of FIG. 10, if the TPM is determined not to support the key dump function, the TCS may retrieve the keys and their respective parent keys that do not require authentication for loading and extraction among keys loaded on the TPM (at S340) (e.g., because the loading and extraction of a key requiring authentication may be restricted in version 1.1 of the TPM).

In the example embodiment of FIG. 10, the TCS may extract the least frequently used key from the keys requiring no authentication (at S320, S330, S340), which may be referred to as a function ExtractKey_AutoEvict. In an example, the TCS may be compatible with any version of the TPM because the TCS may support the key extracting process adaptively in response to a determination as to which version of the TPM is active.

Figure 11:
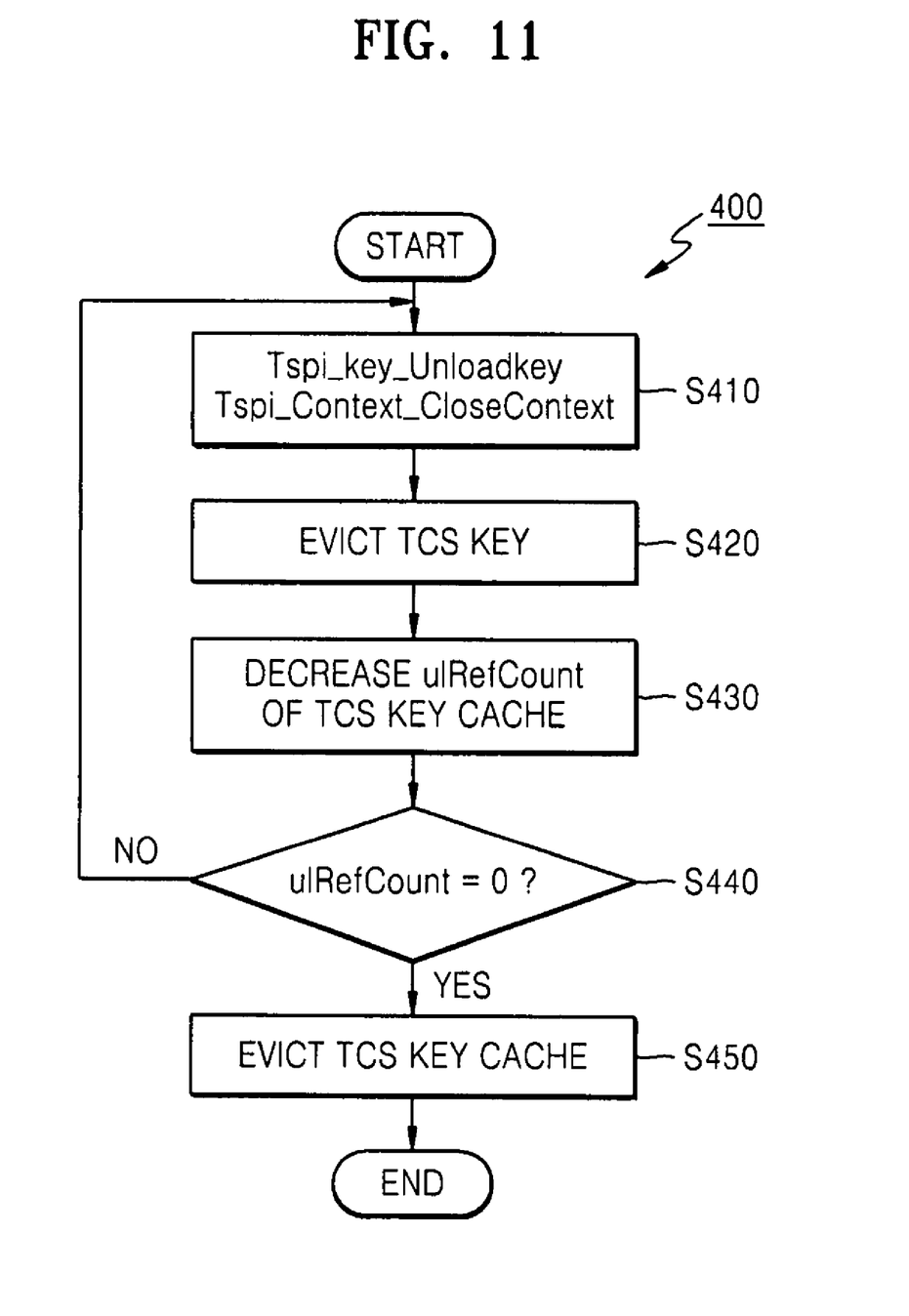
FIG. 11 is a flow chart of a process of evicting a TCS key cache according to another example embodiment of the present invention.

FIG. 11 is a flow chart of a process 400 of evicting a TCS key cache according to another example embodiment of the present invention. In an example, the evicting process 400 of FIG. 4 may correspond to In the example embodiment of FIGS. 2, 3 and 11, after a given key has been used during the key cache management process 100 of FIG. 2, the TCS key cache corresponding to the given key may be "evicted". For example, if an application receiving a requested key no longer requires the requested key, the application may issue a command TCS_EvictKey to the TCS (at S420) by calling a function Tspi_CloseContext (at S410), and the TCS may reduce a value ulRefCount of the corresponding TCS key cache (at S430). After the value ulRefCount is decremented, the above-process (S410, S420, S430) may repeat until ulRefCount is decremented to a value equal to a threshold value (e.g., 0) (at S440). The TCS may evict a TCS key cache for which the value ulRefCount is decremented to the threshold value (at S450).

Example embodiments of the present invention being thus described, it will be obvious that the same may be varied in many ways. For example, while the above-described example embodiments are directed to a TCS performing the operations of updating, generating, evicting, etc. information of a TCS key cache, these operations may be performed by any well-known module in other example embodiments of the present invention (e.g., a key cache manager).

Such variations are not to be regarded as a departure from the spirit and scope of example embodiments of the present invention, and all such modifications as would be obvious to one skilled in the art are intended to be included within the scope of the following claims.

What is claimed is:

1. A method of managing a key cache, comprising:
    determining whether a given key has previously been loaded into a trusted platform module (TPM) from a persistent storage;
    loading the given key into the TPM and generating a key cache object in the key cache, the key cache being separate from the TPM and the persistent storage, the key cache object corresponding to the given key if the determining step determines the given key has not previously been loaded to the TPM, the key cache object including at least a key identifier and a key handle, the key cache object being associated with a linked list shared by one or more applications; and
    restoring the given key to the TPM based on the key cache object corresponding to the given key if the determining step determines the given key has previously been loaded into the TPM.

2. The method of claim 1, wherein the key cache object is embodied as a linked list.

3. The method of claim 2, further comprising:
    initializing the linked list.

4. The method of claim 3, wherein initializing the linked list includes:
    requesting the TPM to transmit a list of keys loaded in the TPM;
    receiving the requested list of keys from the TPM; and
    evicting the received keys from the TPM.

5. The method of claim 1, wherein the loading and generating step includes:
    determining whether the TPM has sufficient memory for loading the given key;
    loading the key to the TPM if the TPM is determined to have sufficient memory; and
    storing information indicating the location of the given key loaded in the TPM in the key cache object.

6. The method of claim 5, wherein, if the TPM is determined to have sufficient memory, loading the key to the TPM includes:
    confirming a version of the TPM; and
    storing the given key in the TPM in a data structure according to the version of the TPM.

7. The method of claim 6, wherein the key cache object stores a point value representing data of the given key, the point value varying based on which version of the TPM is active.

8. The method of claim 5, wherein the key cache object includes information indicating whether the given key is stored in memory.

9. The method of claim 5, wherein the key cache object is generated for each key.

10. The method of claim 9, wherein the key cache object is shared by a plurality of applications if each of the plurality of applications requests the same key to be loaded.

11. The method of claim 10, wherein the key cache object includes information indicating a number of the plurality of applications sharing each key cache object.

12. The method of claim 5, wherein the loading and generating step includes extracting at least one key from the TPM if the TPM is determined not to have sufficient memory.

13. The method of claim 5, wherein the loading and generating step includes setting an aging value of the key cache object, the aging value related to how frequently the key cache object is used.

14. The method of claim 13, wherein a maximum aging value corresponds to the aging value of the most recently used key cache object.

15. The method of claim 1, wherein the restoring step restores the given key based on which version of the TPM is active.

16. The method of claim 15, wherein the restoring step restores the given key to the TPM in a key slot unit if the TPM supports a function of loading or extracting the key in the key slot unit.

17. The method of claim 15, wherein the restoring step restores the given key to the TPM in the unit of a data structure of the given key if the TPM does not support the function of loading or extracting the key in the key slot unit.

18. The method of claim 15, wherein the restoring step includes:
    locating a parent key, which has been loaded in the TPM, of the given key;
    loading a first child key of the parent key to the TPM;
    determining whether the first child key loaded in the TPM corresponds to the given key; and
    restoring the first child key to the TPM if the first child key corresponds to the given key.

19. The method of claim 18, wherein the restoring step further includes:

loading a second child key of the first child key to the TPM if the first child key is determined not to correspond to the given key; and determining whether the second child key loaded in the TPM corresponds to the given key.

20. The method of claim 19, wherein the key cache object includes information associated with the parent key.

21. The method of claim 15, wherein the restoring step includes:

determining whether the TPM has sufficient memory for restoring the given key;

restoring the given key to the TPM if the TPM is determined to have sufficient memory; and extracting at least one key from the TPM if the TPM is determined not to have sufficient memory.

22. The method of claim 21, wherein the restoring step further includes:

setting an aging value, indicating a frequency of key cache object usage, of a key cache object corresponding to the restored key to a value larger than a maximum aging value, the maximum aging value corresponding to the aging value of the most recently used key cache object.

23. The method of claim 1, wherein the determining step includes determining whether a key cache object corresponding to the given key is present.

24. The method of claim 1, further comprising:

extracting at least one key loaded in the TPM if the TPM does not include sufficient memory to load the given key.

25. The method of claim 24, wherein the extracting step is performed based on which version of the TPM is active.

26. The method of claim 25, wherein the extracting step extracts a key corresponding to a least frequently used key cache object if the TPM version supports the function of loading or extracting the key in a key slot unit.

27. The method of claim 25, wherein the extracting step extracts a key, which does not require authentication for being loaded to or extracted from the TPM and corresponds to a least frequency used key cache object of the TPM, if the TPM does not support the function of loading or extracting the key in a key slot unit.

28. The method of claim 24, wherein the key cache object includes an aging value indicating how often the key cache object is used.

29. The method of claim 24, wherein the key cache object stores information associated the extracted key.

30. The method of claim 1, further comprising:

returning a key handle representing the location of the given key loaded in the TPM if the given key is loaded to the TPM.

31. The method of claim 30, wherein the key cache object stores information associated with the key handle.

32. The method of claim 1, further comprising:

evicting the key cache object corresponding to the given key after the given key is used.

33. The method of claim 32, wherein the evicting step includes:

receiving a request from an application indicating that the given key is no longer required by the application;

determining whether the given key is shared by another application; and evicting the key cache object corresponding to the given key if the determining step determines that no other application shares the given key.

34. The method of claim 33, wherein determining whether the given key is shared by another application is based on information stored in the key cache object for the given key which indicates the number of applications using the given key.

35. A method of managing a key cache, comprising:

extracting a key from a trusted platform module (TPM) if the TPM is determined not to have sufficient memory to load a new key, the extracted key corresponding to a least frequently used key cache object in the key cache, the key cache being separate from the TPM if the TPM is operating in accordance with a first TPM protocol, the extracted key not requiring authentication for loading to or extracting from the TPM and corresponding to a least frequently used key cache object in the key cache, the key cache being separate from the TPM if the TPM is operating in accordance with a second TPM protocol, the key cache object including at least a key identifier and a key handle, the key cache object being associated with a linked list shared by one or more applications.

36. The method of claim 35, wherein the first TPM protocol includes support for a loading of keys to the TPM and an extraction of keys from the TPM in a key slot unit, and the second TPM protocol does not include support for a loading of keys to the TPM and an extraction of keys from the TPM in a key slot unit.

37. The method of claim 35, wherein the key cache object includes an aging value indicating a frequency of use for the key cache object.

38. The method of claim 35, wherein the key cache object includes information associated with the extracted key.

39. A method of managing a key cache, comprising:

restoring a key to a trusted platform module (TPM), in response to a request to load the restored key, the restored key having been previously loaded into the TPM from a persistent storage and extracted from the TPM, the restored key having a key cache object in the key cache, the key cache being separate from the TPM and the persistent storage, the key cache object corresponding to the restored key, the key cache object including at least a key identifier and a key handle, the key cache object being associated with a linked list shared by one or more applications, the restored key being restored to a key slot unit if the TPM is operating in accordance with a first TPM protocol, and the restored key being restored in a unit of a data structure of the restored key if the TPM is operating in accordance with a second TPM protocol.

40. The method of claim 39, wherein the first TPM protocol includes support for a loading of keys to the TPM and an extraction of keys from the TPM in a key slot unit, and the second TPM protocol does not include support for a loading of keys to the TPM and an extraction of keys from the TPM in a key slot unit.

41. The method of claim 39, wherein restoring the key in accordance with the second TPM protocol includes:

locating a parent key, which has been loaded in the TPM, of the restored key;

loading a first child key of the parent key to the TPM;

determining whether the first child key loaded in the TPM corresponds to the restored key; and restoring the first child key to the TPM if the first child key corresponds to the restored key.

42. The method of claim 41, wherein restoring the key in accordance with the second TPM protocol further includes:

loading a second child key of the first child key to the TPM if the first child key is determined not to correspond to the restored key;

determining whether the second child key loaded in the TPM corresponds to the restored key; and restoring the second child key to the TPM if the second child key corresponds to the restored key.

43. A method of managing a key cache, comprising:

storing information corresponding to a key requested to be loaded into a trusted platform module (TPM) within a key cache object in the key cache, the key cache being separate from the TPM, the key cache object including at least a key identifier and a key handle, the key cache object being associated with a linked list shared by one or more applications, the information stored within the key cache object further including, a position of the key, an indication as to whether the key is stored in memory, an indicator indicating a frequency of use of the key, a point value associated with data of the key, the point value affected by which of a plurality of TPM protocols is active, information associated with a parent key of the key, and information related to data extracted from the TPM.

44. The method of claim 43, wherein the information associated with the parent key of the key includes information associated with a parent key cache object for the parent key.

45. The key cache management method of claim 43, wherein the key cache object is embodied as a linked list.

\* \* \* \* \*